Dec. 2, 1958  W. D. VINSON ET AL  2,863,035
HEATING AND TEMPERATURE SENSITIVE CONTROL WIRE
Filed Jan. 3, 1956
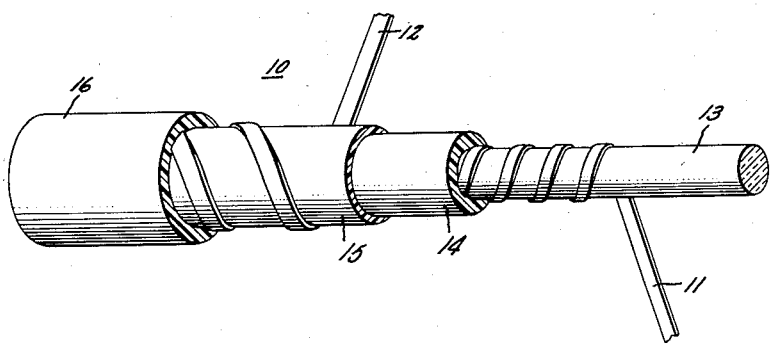
Inventors:
William D. Vinson,
Joseph F. Jacoby,
by Lawrence R. Kempton
Their Attorney.

United States Patent Office 2,863,035
Patented Dec. 2, 1958

2,863,035

HEATING AND TEMPERATURE SENSITIVE CONTROL WIRE

William D. Vinson and Joseph F. Jacoby, Asheboro, N. C., assignors to General Electric Company, a corporation of New York Application January 3, 1956, Serial No. 557,019

4 Claims. (Cl. 201—63)

This invention relates to electrical heating and temperature sensitive control wire for electric blankets and the like, such wire providing heat output and temperature sensing means continuously throughout its length.

In Patent 2,581,212, issued January 1, 1952, to David C. Spooner, Jr., and Milton S. Greenhalgh, assigned to the General Electric Company, assignee of this application, an electrically-heated fabric is disclosed and claimed, such fabric including a heating and temperature sensitive wire construction. More particularly, this patent discloses the use of two electrical conductors for heater and signal wires respectively separated by a compound which electrically insulates the conductors at normal operating temperature and which changes its electrical characteristics to permit passage of electric currents of control magnitude at elevated temperatures.

In the practice of the invention of the aforesaid Spooner et al. Patent 2,581,212, it has been found that among the synthetic polyamide compounds which provide desired electrical characteristics, particular types are especially desirable for the highly stable electrical characteristics maintained over long periods of operation at varying temperatures. In other words, the resistance, inductive and capacitive reactance, and impedance as functions of temperature remain substantially constant throughout the operating life of the flexible electric heating and signal wire made up with such compounds. However, it is found that the polyamides or nylons which exhibit such desirable heat aging characteristics do not necessarily maintain satisfactory stability of their electrical properties when subjected to moisture and to the wide variety of atmospheric humidity conditions which may be encountered in the use of such electrically-heated fabrics. On the other hand, certain other synthetic polyamide resins exhibit highly stable electrical characteristics even when subjected to the widest range of moisture and humidity; but these compounds may be lacking in the desirable heat aging characteristic. In other words, prolonged manufacturing and field experience in the electrically-heated fabric field has demonstrated a need for further improvement to prolong operating life and increase reliability under all possible conditions of operation.

An object of the present invention is to provide a heater and signal wire construction for electric blankets and the like, capable throughout its length of providing a signal responsive to temperature, and characterized by stability in electrical characteristics over long periods of operation under constantly varying temperatures and over a wide range of atmospheric humidity.

Another object of this invention is to provide such electrical heating and temperature sensitive signal wire having a high degree of reliability under operating conditions.

In accordance with one aspect of our invention, heater and temperature sensing signal wire for electrically-heated fabrics is constructed with separate bare electrical conductors, one of which is a heater wire, while the other is for control or signal purposes. These two conductors are separated by multiple layers of polyamide resins. One of the layers is selected from those resins which provide a high degree of stability in electrical characteristics when subjected over a long period of time to temperatures constantly varied over normal operating range. Another layer is selected from those polyamides which exhibit a high degree of electrical stability when subjected to moisture and wide variations in humidity in the surrounding atmosphere. These layers together form the temperature sensing medium by their exhibited change in electrical impedance as a function of temperature. The resultant heater and control wire is therefore able to withstand temperature aging and a wide range of humidity without appreciable change in the temperature-impedance characteristics.

The features of our invention which we believe to be novel are set forth with particularity in the appended claims. The invention itself, however, both as to its organization and method of operation, together with further objects and advantages thereof, may best be understood by reference to the following description taken in connection with the accompanying drawing, in which the single figure is an enlarged view, partially in section, showing an electrical heating and temperature sensing signal wire construction in accordance with the present invention.

In the drawing, a combined heating and temperature sensitive signal wire construction 10 is illustrated as including a pair of concentrically and spirally-wrapped bare electrical conductors 11 and 12. Conductor 11, which may be for electrical heating purposes, is wrapped or spiralled around a core 13 of electrical insulating material, such as a flexible strand or fibre glass, or stranded cellulose acetate. In one practical embodiment, for example, this core has a diameter of .020", and the heater wire 11 consists of a conductor .010" wide and .002" thick wrapped at a rate of 35 turns per inch. The outer conductor, which may be used for control purposes, is spirally wrapped concentrically with the heater wire in such a manner as will provide a short radial path from the inner conductor to the outer conductor at a number of points along the length of wire 10. Separating electrical conductors 11 and 12 is a tube of synthetic polyamide resin. As disclosed in the aforesaid Spooner et al. patent, the polyamides provided a very high electrical impedance at temperatures of around 105° F., such that at such temperatures, the conductors are electrically insulated from one another. However, at elevated control temperatures materially in excess of 105° F., but materially less than 500° F. (the approximate softening point of the polyamides) this polyamide compound provides a conductive path between the conductors to pass an electrical current of controlling magnitude. Thus, the current which flows between the conductors is a function of temperature. Also, the total current which flows from the inner conductor to the outer conductor, or vice versa, is also a function of the total length of wire involved. For example, if the temperature of the polyamide is approximately 260° F., a length of approximately two feet provides a control current sufficient to cause operation of a work device to open the electrical circuit. On the other hand, if the temperature of the polyamide separating conductors 11 and 12 is only 215° F., ten feet of such thermostatic wire may be required to produce the same control current effect.

In prior constructions, the polyamide separating the electrical conductors has been a single resin selected to provide as nearly as possible the desired electrical characteristics. However, in practise, it has been found that there are a number of polyamide resins sold under the name "nylon" from which to choose. It was discovered that certain of these nylons were entirely satisfactory under all operating conditions, except prolonged exposure to high humidity. In general, the effect of high humidity was to lower the electrical impedance of the compound at a given temperature. Therefore, under such circumstances, the work circuit employed might function to disconnect the electrical heater wire from the source of power, even though an abnormally high temperature had not been encountered at any place along the length of the thermostatic wire assembly. This difficulty can, of course, be rectified, at least in part, by providing a water-inhibiting coating on the outside of control wire 12. For example, polyethylene has been employed for this purpose.

There has also been an effort to avoid the false temperature indication resulting from high humidity by the selection of a different polyamide resin. While such efforts have been successful from the standpoint of humidity, it has been found in practice that the resins which exhibit satisfactory stability under the various humidity conditions are not totally satisfactory in other respects. In particular, certain nylon compounds do not exhibit satisfactory heat aging characteristics. Obviously, this temperature sensing mass is subjected to a substantial temperature range from normal ambient temperature up to the relatively high temperature at which the control effect terminates further supply of power to the electrical heating system. At the temperature cycles between or within these extremes over a prolonged period of time, it is found that the electrical characteristics of the temperature sensing compound change. More specifically, the impedance for a given length of wire at a given temperature does not remain constant following prolonged heat exposure.

It is contemplated that a work circuit is employed in each case with this thermostatic wire construction to accomplish the desired control effect. Typically, a work circuit of one of the type disclosed and claimed in Patent 2,565,478, issued August 28, 1951, to George C. Crowley, and assigned to the General Electric Company, assignee of this application, is utilized. In any event, the work circuit employed is made up of various electrical elements of known characteristics selected to provide the desired operation when coupled with thermostatic wire of given characteristics. If the impedance-temperature relationship of the thermostatic wire construction shifts, the desired temperature control points are no longer maintained at the desired values.

In accordance with the present invention, multiple layers of polyamide resins are employed for separating electrical conductors 22 and 12. More specifically, one of the layers is selected from those polyamide resins which provide substantially constant electrical characteristics over prolonged temperature cycling. In other words, this layer is selected to exhibit great resistance to heat aging. Another layer is selected from the polyamide resins which provide the desired resistance to change in electrical characteristics responsive to humidity variations. By way of example, one of the nylon compositions particularly suitable for its resistance to heat aging is supplied by the manufacturer, E. I. du Pont de Nemours and Company, as FM3606 or "Zytel 3606." This same manufacturer supplies nylon compounds which are resistant to the effects of humidity, and one of these compounds found to be especially suitable may be purchased under the designation FM3003, or "Zytel 33."

Referring to the drawing, either of the layers may be placed on the inside. For example, a layer or tube 14 of humidity-resistant material may be extruded over conductor 11. Then, before conductor 12 is applied, an additional layer or tube 15, selected from the compounds providing desirable heat aging, is extruded over layer 14. Both layers 14 and 15, however, are selected from the polyamide compounds having the desired temperature coefficient of imedance so that the conductors are insulated from each other electrically at normal temperatures, and so that a conducting path is established at elevated temperatures.

Assuming by way of example, that compounds FM3003 and FM3606 are employed, it has been found that FM-3003 has a slightly higher melting point than the other compound. Therefore, from a manufacturing standpoint, it may be desirable to apply FM3003 as the compound for layer 14 followed by application by extrusion of a layer of compound FM3606. However, it has also been found that by proper control of manufacturing processes, these layers can be applied in the reverse order in which case, the outer layer is highly resistant to moisture and high humidity. From an operating standpoint, it may be somewhat preferable to apply the humidity-resistant compound as the outer layer. Nevertheless, both arrangements have proved satisfactory from an operating and manufacturing standpoint.

Referring again to the drawing, the control wires along with the temperature-sensing layers are enclosed in an outer insulating and protective sheath 16. This sheath, of course, may be any of the well-known compounds used for such purposes, such as a polyvinyl chloride. Such a cable is particularly suitable for use in electrically-heated fabrics such as blankets and other bed covers. Wire with this construction can be made very flexible, and assuming that the control layers 14 and 15 each are approximately .005 inch thick, the total diameter of the wire may be less than 0.1 inch.

While the present invention has been described by reference to particular embodiments thereof, it is to be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. A heater and temperature sensitive control wire for electrically-heated fabrics comprising first and second bare electrical conductors, multiple layers of flexible synthetic polyamide resins separating said electrical conductors, said layers having temperature impedance coefficients to insulate electrically said bare conductors one from the other at a temperature of around 105° F., and to provide a conductive path between said bare conductors to pass an electrical current of controlling magnitude at elevated control temperatures materially in excess of about 105° F. but materially less than 500° F. and which temperatures vary inversely with the length of said polyamide layers which are heated to said elevated temperatures, one of said layers being selected from those polyamide resins providing substantially constant electrical characteristics over prolonged temperature cycling, another of said layers being selected from those polyamide resins which maintain substantially constant electrical characteristics over a wide range of humidity, and a flexible electrically insulating jacket encompassing said conductors and layers.

2. A heater and temperature sensitive control wire for electrically heated blankets and the like comprising a flexible core of insulating material, first and second bare electrical conductors, said first electrical conductor being supported on said flexible core, multiple layers of flexible synthetic polyamide resins separating said electrical conductors, one of said layers directly encompassing one of said conductors and said other layer encompassing said first layer, one of said layers being selected from those polyamide resins exhibiting a high resistance to aging from heat, another of said layers exhibiting substantially constant electrical characteristics over a wide range of humidity, both of said layers having temperature impedance coefficients to insulate electrically said bare conductors one from the other at a temperature of around 105° F., and to provide a conductive path between said bare conductors to pass an electrical current of controlling magnitude at elevated control temperatures materially in excess of about 105° F., but materially less than 500° F. and which temperatures vary inversely with the length of said layers which are heated to said elevated temperatures.

3. A heater and temperature sensitive control wire for electrically-heated fabrics comprising a flexible core of insulating material, heater wire wrapped on said core, a first layer of flexible synthetic polyamide resin encompassing said heater wire, said first layer being selected from those polyamide resins exhibiting resistance to heat aging, a second layer of flexible synthetic polyamide resin encompassing said first layer and being selected from those polyamide resins exhibiting substantially constant electrical characteristics over a wide range of humidity, both of said layers having a temperature impedance coefficient to insulate electrically at normal operating temperatures and to provide a conductive path to current of controlling magnitude at elevated control temperatures but materially less than the softening temperatures of the layers, a control conductor spirally wrapped over said layers, and an outer electrical insulating jacket.

4. A heater and temperature sensitive control wire for electrically-heated fabrics comprising a flexible core of insulating material, a bare electrical conductor wrapped on said core, a first layer of flexible synthetic polyamide resin encompassing said electrical conductor, said first layer being selected from those polyamide resins which exhibit substantially constant electrical characteristics over a wide range of humidity, a second layer of flexible polyamide resin encompassing said first layer and being selected from those polyamide resins exhibiting a high resistance to heat aging, both of said layers having a temperature impedance coefficient to insulate electrically at normal operating temperatures and to provide a conductive path to pass current of controlling magnitude at elevated controlled temperatures, such elevated temperatures being materially less than softening temperatures of the layers, a control conductor supported on said outer layer, and an outer electrically insulating jacket.

References Cited in the file of this patent

UNITED STATES PATENTS

| | | |
|---|---|---|
| 2,565,478 | Crowley | Aug. 28, 1951 |
| 2,581,212 | Spooner et al. | Jan. 1, 1952 |
| 2,581,213 | Spooner | Jan. 1, 1952 |